United States Patent
Suman et al.

(10) Patent No.: US 10,078,374 B2
(45) Date of Patent: Sep. 18, 2018

(54) METHOD AND SYSTEM ENABLING CONTROL OF DIFFERENT DIGITAL DEVICES USING GESTURE OR MOTION CONTROL

(71) Applicants: Saurav Suman, Jharkhand (IN); Harshit Shrivastava, Madhya Pradesh (IN)

(72) Inventors: Saurav Suman, Jharkhand (IN); Harshit Shrivastava, Madhya Pradesh (IN)

(*) Notice: Subject to any disclaimer, the term of this patent is extended or adjusted under 35 U.S.C. 154(b) by 451 days.

(21) Appl. No.: 14/655,005

(22) PCT Filed: Jan. 3, 2014

(86) PCT No.: PCT/IN2014/000006
§ 371 (c)(1),
(2) Date: Jun. 23, 2015

(87) PCT Pub. No.: WO2014/106862
PCT Pub. Date: Jul. 10, 2014

(65) Prior Publication Data
US 2015/0355719 A1    Dec. 10, 2015

(30) Foreign Application Priority Data

Jan. 3, 2013 (IN) ............... 5/KOL/2013
Jan. 1, 2014 (IN) ............... 5/KOL/2014

(51) Int. Cl.
*G06F 3/01* (2006.01)
*G06F 3/03* (2006.01)
*G06F 3/0488* (2013.01)

(52) U.S. Cl.
CPC .............. *G06F 3/017* (2013.01); *G06F 3/014* (2013.01); *G06F 3/0304* (2013.01); *G06F 3/0488* (2013.01); *G06F 2203/04108* (2013.01)

(58) Field of Classification Search
CPC ... G06F 3/017; G06F 3/014; G06F 2203/0331
See application file for complete search history.

(56) References Cited

U.S. PATENT DOCUMENTS 5,933,149 A * 8/1999 Mori ............... G06F 3/0488
345/442
6,002,808 A    12/1999 Freeman
(Continued)

FOREIGN PATENT DOCUMENTS

| EP | 1573498 B1 | 12/2011 |
| WO | 2011045786 A2 | 4/2011 |
| WO | 2012064803 A1 | 5/2012 |

OTHER PUBLICATIONS

ISA/Indian Patent Office International Search Report, PCT/IN2014/000006, dated May 5, 2014, 5 pages.

*Primary Examiner* — David Tung

(57) ABSTRACT

A system for controlling operation of digital devices according to gesture of its user comprising: at least one gesture indicating hardware; at least one imaging device for capturing at least one first array of images of the at least one gesture indicating hardware; and a processor for processing the captured stream of images for; identifying at least one second array of images of the at least one gesture indicating hardware from the at least one first array of images captured by the at least one imaging device; determining at least one geometrical characteristic of bodies present in the at least one second array of images and their variation to construct at least one motion path of the at least one gesture indicating hardware; determining at least one key coordinates point representing at least one motion path; and generating at least one operating instruction to control at least one operation of at least one digital device. Noise cancellation while gesture detection is carried out by evaluating errors as a function of relative distances, boundary distances, and characteristics of (Continued)

various bodies identified beyond a threshold image size. Another approach of removing noise in gesture detection is to fix the emitting device in a still environment and identifying still bodies except emitter and thereby removing those stilt objects while capturing emitting device in motion.

18 Claims, 3 Drawing Sheets

(56) References Cited

U.S. PATENT DOCUMENTS

| | | |
|---|---|---|
| 2006/0033713 A1* | 2/2006 | Pryor .................. G06F 3/042 345/158 |
| 2006/0136846 A1 | 6/2006 | Im et al. |
| 2006/0187196 A1 | 8/2006 | Underkoffler et al. |
| 2012/0056982 A1* | 3/2012 | Katz .................. H04N 13/025 348/43 |
| 2014/0125864 A1* | 5/2014 | Rihn .................. H04N 5/2256 348/367 |

* cited by examiner

D=r

Distance from assigned center (D)

D= minor axis    D= major axis

Distance from assigned center (D)

METHOD AND SYSTEM ENABLING CONTROL OF DIFFERENT DIGITAL DEVICES USING GESTURE OR MOTION CONTROL

TECHNICAL FIELD OF INVENTION

The present invention relates to a method and system for controlling a digital device remotely operated by human gesture or motion. More particularly, the present invention is basically directed to develop a unique method and system which can control any digital device such as laptops, desktops, tablets, phones, television, radio and enables the device to perform all its regular activities like moving cursor, rotating or moving objects like 3D models, zoom in or out the image, navigate into 2D and 3D maps, opening, closing, minimizing windows and many other applications wherein this activities is initiated and controlled by the hand gesture of the user. The present advancement involves minimum hardware for the said operation and a digital device can be remotely operated by multiple users to simultaneously work on a task, thus accelerating collaboration.

BACKGROUND OF THE INVENTION

Digital devices in the past have been controlled by buttons, keys, and pointing devices like mouse, laser pointer. Emulating natural human control by controlling devices using human gesture is a new advancement. Digital devices have been remotely controlled via audio inputs and remotely accessible pointing device inputs provided by user. There have also been advancements in emulating touch gestures by using touch screens as touch sensing devices in smartphones and tablets.

There have also been advancements in emulating hand gestures to remotely control a digital device. Few outfits use neural signature sensors and gyroscopes on hand to identify different neural signatures and thereby detect hand gesture. Other outfits use Radio Frequency emitting devices on hand as input signals to be detected by a sensor and thereby detecting motion of the hand.

Systems which use pointing devices or radio frequency emitting devices typically required a bulky hardware along with them to detect correct hand gestures at high speeds with a good amount of sensitivity. This blocks their use of remote control hand gesture gadget as a portable and wearable one for use to control portable digital devices like laptops, mobile phones, desktops, and even locale digital devices like television because of wear-ability and usability issues.

Thus there has been a always need of a unique method and system which would enable the remote controlling of different digital devices through a natural user interface using gestures and motion control without involving any bulky dedicated motion or gestures sensing devices. The method and the apparatus should be capable of enabling any laptops, tablets, desktops etc. and effectively perform all regular activities of the digital device. The device should be wearable, portable, and ergonomically designed to ease user in emulating hand gestures to remotely control digital devices.

OBJECT OF THE INVENTION

It is thus the basic object of the present invention is to develop a unique method and system which enables the controlling of different digital devices through a natural user interface using gestures and motion control.

Another important object of the present invention is to provide a method and system which can be easily associated with any laptops, tablets, desktops etc. and facilitates the gestures based operation of the laptops, tablets, desktops.

Another important object of the present invention is to provide a gesture or motion controlled handy and portable computing device which allows multiple users to simultaneously work on a single computer on a single engineering design which accelerates the development of engineering projects, hardware designs and robotics designs.

Another object of the present invention is to provide a gesture or motion controlled computation technique adapted to handle and edit 3D models, in architecture and product designing.

A further object of the present invention is to provide a gesture or motion controlled computation technique adapted to low coast 3-Dimensional scanning of physical objects, generating their soft 3D designs and editing and modeling them.

Another object of the present invention is to provide a gesture or motion controlled computation technique which can make computer gaming much more realistic with physical involvement of users without involving any costly gaming devices.

A further object of the present invention is to provide a gesture or motion controlled computation technique adapted to alleviate presentations and lectures in classrooms.

SUMMARY OF THE INVENTION

A system for controlling operation of digital devices according to gesture of its user comprising: at least one gesture indicating hardware; at least one imaging device for capturing at least one first array of images of the at least one gesture indicating hardware; and a processor for processing the captured stream of images for; identifying at least one second array of images of the at least one gesture indicating hardware from the at least one first array of images captured by the at least one imaging device; determining at least one geometrical characteristic of bodies present in the at least one second array of images and their variation to construct at least one motion path of the at least one gesture indicating hardware; determining at least one key coordinates point representing at least one motion path; and generating at least one operating instruction to control at least one operation of at least one digital device.

Noise cancellation while gesture detection is carried out by evaluating errors as a function of relative distances, boundary distances, and characteristics of various bodies identified beyond a threshold image size. Another approach of removing noise in gesture detection is to fix the emitting device in a still environment and identifying still bodies except emitter and thereby removing those still objects while capturing emitting device in motion.

BRIEF DESCRIPTION OF THE ACCOMPANYING FIGURES

Figure 2A:
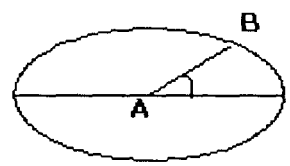
Figure 2B:
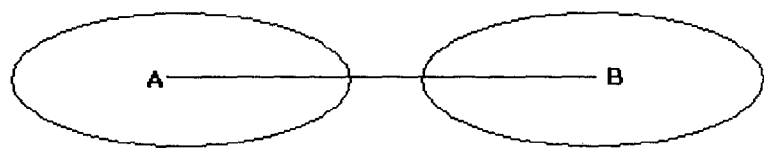
Figure 2C:
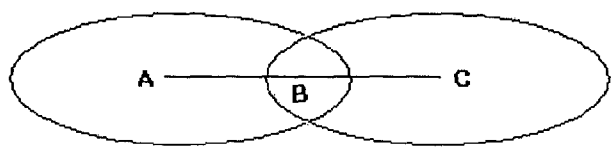

FIG. 2 (a)-(c) schematically illustrates different geometrical characteristics involved in the present system for detecting gesture of the user.

Figure 3A:
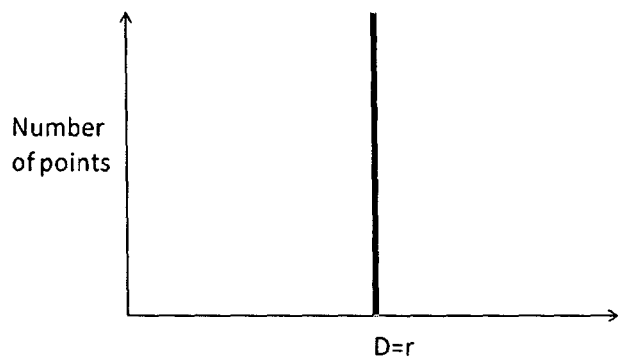
Figure 3B:

FIG. 3(a)-(b) shows the pixel distribution in different bodies.

Figure 4A:
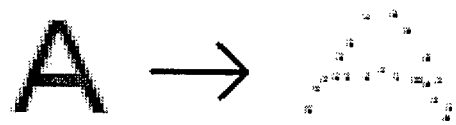
Figure 4B:
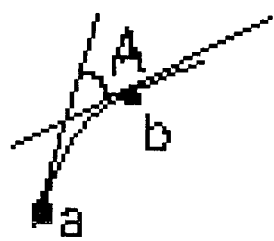
Figure 4C:
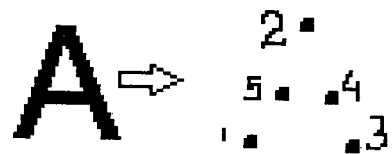

FIG. 4(a)-(c) illustrates the mechanism for storing the sequence of the key coordinates of motion of the gesture indicating hardware.

DETAILED DESCRIPTION OF THE INVENTION WITH REFERENCE TO THE ACCOMPANYING FIGURES

Figure 1A:
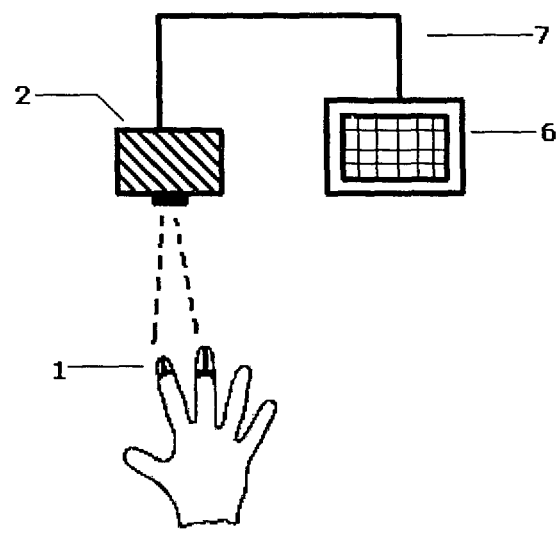
FIG. 1(a) shows an embodiment of the system of the present invention for controlling the operation different digital devices based on the gesture of its user.

Reference is first invited from the accompanying FIG. 1(a) which shows an embodiment of the system of the present system for controlling the operation different digital devices based on the gesture of its user. The present system is particularly adapted to be used in all types of different digital devices such as laptops, tablets, desktops, smart phones etc. and enables the user to control and interact with such digital device through a natural user interface using gestures and motion control including the hand and finger movement.

As shown in the said figure, the present system for enabling any conventional digital devices as gesture controlled devices comprises gesture indicating hardware 1 and imaging device 2. The gesture indicating hardware 1 of the present system is a device that prominently emits a selected range of electromagnetic radiation and the imaging device 2 is an image sensor or a set of image sensors that capture the image of the gesture indicating hardware 1 and detects or senses electromagnetic radiation or signal emitted by the said gesture indicating hardware 1 along with where the electromagnetic radiation or signal is coming from.

Figure 1B:
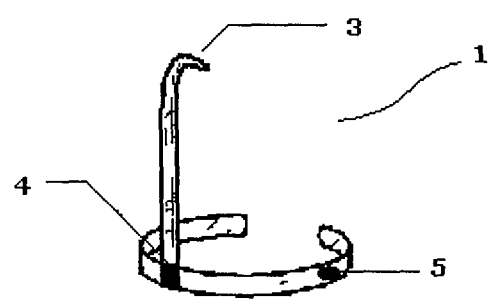
FIG. 1(b) shows a preferred embodiment of gesture indicating hardware associated with the present system of the present invention.

Reference is now invited from the accompanying FIG. 1(b) which shows a preferred embodiment of the gesture indicating hardware 1. As shown in the said figure, the gesture indicating hardware 1 is basically a tiny (less than an inch), wearable (preferably on finger/thumb), slightly flexible (to fit comfortably in finger/thumb and to adjust in different fingers of one or more persons), ring type device, with specialized electronics embedded in it. The said gesture indicating hardware 1 comprises electromagnetic signal emitter 3 preferably IR emitter for generating and thereby emitting the selected range of electromagnetic signal, a power source or battery 4 for supplying electrical power to the emitter 3 and a push button switch 5 for selectively OFF/ON the emitter 3.

The selected range of electromagnetic signal emitted by the said emitter 3 may correspond to a particular colour or a certain wavelength range of Infrared radiation or any similar range.

In a preferred embodiment of the present system, which is used under sun light, the emitter 3 of the gesture indicating hardware 1 is specially developed to generate infrared radiations of wavelengths either between 1340 nanometer to 1460 nanometer or between 1740 nanometer to 2000 nanometer to avoid the problem of sun's interference with the emitter radiation as the sun's radiation intensity is very low between the above mentioned wavelength ranges. The imaging device 2 also involves image sensor specially adapted for detecting or sensing the infrared radiations of wavelengths either between 1340 nanometer to 1460 nanometer or between 1740 nanometer to 2000 nanometer The imaging device 2 of the present system may be in a separated module adapted to be operatively connected with the digital device 6 by using USB or other connection 7 or can be built in the digital devices. The working of the imaging device 2 is further enhanced by using one or more filters to avoid any other electromagnetic radiation with wavelength range except the range/ranges emitted by the gesture indicating hardware 1 mentioned above. This will reduce the noise and significantly reduce the processing required. The Images or the sensory data captured per second i.e. Frames Per Second by the image sensors is kept almost constant by fixing the time of exposure of the imaging device 2 for capturing one image. By keeping the time of exposure low, the light entered per image can be minimized, hence the removal of everything else, except the strong electromagnetic radiation or signal having selective wavelength range from the emitters 3 would be possible by using electromagnetic signal filter having pass band matched with the selected wavelength range.

Now, for smoothing the sensing or imaging of motion of the gesture indicating hardware 1, the number of images captured per second or frame per second (fps) is increased. In a preferred embodiment of the system of the present invention, the imaging device 2 involves multiple image sensors with lower fps in a selective fashion to constitute a single image sensor with higher fps. For example, in an embodiment, wherein the imaging device 2 involves two image sensors of m fps, the assembly of the two sensors are converted into a single sensor of 2 m fps. This is done by starting the first sensor and then starting the second sensor after ½ m seconds of the first sensor. Hence the two sensors combined, starts providing images at an interval of ½ m seconds reaching effectively 2 m fps. In the said embodiment, these two sensors are kept nearby and standard' stereo vision technique is used to find the position of the emitter 3 in 3-Dimensional space.

The image sensors of the imaging device 2 is also adapted to simultaneously detect or sense electromagnetic radiations or signals emitted by the multiple gesture indicating hardware along with their location for allowing multiple people to use the same device.

The system of the present invention also comprises a processor in the imaging device adapted for detecting and thereby separating the gesture indicating hardware image from neighboring environment and determining data relating to consecutive positions, orientations and distance of the said gesture indicating hardware to identify the gestures and accordingly provide instruction to the digital device to perform desired activities.

In preferred of the present system wherein the imaging device 2 operatively connected to any conventional Television set is adapted to continuously detect the signal emitted by the remote of the television set and thereby detect motion path of the remote while emitting signal to identify the gestures and accordingly control the operation of the television set. Hence by using the present system, the remote of any usual television set can be used as the gesture indicating hardware to enable the television set gesture operated. In such application the remote of the television circuit is modified by incorporating additional operating switches to enable the remote for continuously emit signal during the gesture.

In the present system, the identification and the separation of the images of the different emitters from the imaging device captured complete images is performed by the said processor by analysing different attributes of the captured images.

The different attributes of the captured images involved for identifying and separating the images of different emitters includes colour content and their distribution, geometrical characteristics, motion characteristics and removal of pre-stored environmental disturbances, previous positions and motion of the emitters in the captured images and the distribution of pixels in the captured image at different distances from an assigned centre.

In the present invention, for separating the images of the different emitters on the basis of colour content a particular colour and a threshold value around it is chosen and only the pixels in the captured image having colour value lying within this range are considered for further processing. In a preferred embodiment of the present system, wherein the emitter prominently emits a selected range of Electromagnetic radiations, a certain distribution of colour and colour intensity is found in the captured Image. In such distribution the maximum intensity is encountered in the centre and the coloured part is observed at a certain distance from the centre. Hence if a colour distribution is found within the captured Image, it is considered as a signature for Identification of the emitter in the captured image. In case the emitter emits in a range of electromagnetic radiation or signal that can not be resolved by normal Image sensor into any colours, the Image of the emitter appears like a monochromatic image having highest intensity (brightness) at a point in the image and it decreases as a function of the distance from the point. Hence if there is an intensity distribution within the Image, it is considered as one of the signature for Identification of the emitter in the captured image.

In the present system, the processor comprises a pixel intensity computing module for determining the intensity of the pixels in the image sensors captured image and finding the pixels in the image having highest intensity with the pixels with decreasing intensity as a function of the distance from the said highest intensity pixels to locate the emitters in the image.

In the present invention, for separating the images of the different emitters from the captured image stream on the basis of geometrical characteristics, different bodies present in the captured image formed by a set of connected pixels is first identified and a unique tag number is allotted to each of the identified body or the set of connected pixels and then all the pixels inside the tagged body is tagged with that unique tag number. After the tagging operation all bodies are analysed for identifying the image of the emitter. The method for identifying the image of the emitters on the basis of geometrical characteristics firstly involves assigning a point in body present in the captured image that can be taken as a centre of the body. This can be done by assigning a point as the centre of the body where the first or higher moment calculated using the pixels of the set of connected pixels is zero or the point where the total intensity or intensity of selected colours is highest (In case of many such points exists, centroid of them is taken) or the point that is calculated using the weighted average of the pixels in the image of the body where the weights are some function of intensities of corresponding pixels. After assigning the centre diameter of the body is determined. Here, diameter refers to the longest chord connecting two oppositely lying pixels on the boundary of the body parallel to a mentioned direction. If there is no direction mentioned, then the diameter refers to the longest chord. The radius in that direction will be half of the diameter in that direction. The directional radius is approximated by finding the distance between the assigned centre and the boundary pixel at the given angle (direction) for determining the directional (angular) radius. Diameter along that direction can be taken as twice the directional radius. Diameter parallel to that direction can be taken as the sum of the two radii, along and opposite to the direction.

The accompanying FIG. 2(a) shows the boundary pixel B and assigned centre A of the body. The distance AB will be the radius at that angle/direction.

The distance between two bodies present in the captured image streams is approximated as, the distance between their assigned centres and the boundary distance between two bodies is approximated as:

Case 1:

If the two bodies don't have any pixels in common, then two assigned centres are joined with a straight line and the minimum distance between the boundary pixels of the bodies through which this line passes through is assigned as the boundary distance. The accompanying FIG. 2(b) shows the boundary distance between two bodies as distance AB.

Case 2:

If the two bodies have some pixels in common which is mostly occurs when the image of same body is captured in an interval of few milliseconds. A negative value is assigned as the boundary distance having magnitude equal to the ratio of number of overlapping pixels to function of total number of pixels in both images.

In the present system, the said processor in the imaging device also comprises computation unit adapted to calculate the first or higher moment by using the pixels of the set of connected pixels forming a bodies in the image streams and find where it is zero for assigning that as the centre of the body. The said computation unit also calculates the radii of the bodies and the distance between two bodies present in the captured image streams.

Now, the emitting device identified in an image frame is tracked in the subsequent image frames by involving the ratio of various directional radii of the bodies in the subsequent frames to that of the previous selected body identified as the emitter to find the deviation in the directional ratio. The body corresponding to the emitter in the subsequent image frames will have the highest probability of having the lowest deviation from the body that is identified as a particular emitting device in previous selected body. In the present system the computing unit of the processor calculates the ratio of various directional radii of the bodies in the subsequent frames to that of the previous selected body identified as the emitter. The processor of the present system also includes a comparator module to compare the ratio values and find the directional ratio for the body in the subsequent frames showing least deviation to find the emitters in the subsequent image frames.

The Distance of a particular body from the previous selected body identified as a particular emitting device is a very important factor. Lower the distance, higher the probability of the body being the emitting device. The Boundary distance of a particular body from the said previous selected body is another very important factor. Lower the boundary distance, higher the probability of the body being the emitting device.

Every image is captured by exposing the image sensor for a small time interval. Due to this time interval, images of moving objects are distorted. This is because the light reflected/emitted from the moving object comes from different positions that it takes due to its motion during time of exposure of that frame. Due to the component of velocity, parallel to the plane of sensor, the image captured is elongated in the direction of velocity with respect to the imaging sensor. This elongation is proportional to that component of speed with respect to sensor and distance from the sensor. Hence the length of such object image is increased in the direction parallel of object velocity while the length of such object image remains almost unchanged in the directions perpendicular to the object velocity. In the present system, the processor interprets the movement of the gesture indicating hardware by continuous calculating the variation in the geometrical characteristics including diameter of the emitter in the image streams. It is also important to note that the deviation in radius of the identified emitter body perpendicular to the direction of the velocity remains almost unchanged and represents the approximate distance of the emitting device from the image sensors. Hence, the adaptability of determining deviation in radius of the identified emitter body enables the present system to determine distance of the gesture indicating hardware from the imaging device.

In the present invention, for facilitating the separation of the images of the different emitters on the basis of motion characteristic and removal of pre-stored environmental disturbances, the imaging device of the present system is first initialized before initiating the emitters so that the image sensors of the imaging device capture image of the bodies present around the gesture indicating devices. All the pixels of these bodies in the image are stored and listed as disturbance pixels.

After the initiation of the emitters, during normal functioning, whenever any pixel of any body is found as one of these disturbance pixels, the body is discarded as a disturbance.

A further enhancement in the said separation process is done by checking the geometrical and colour characteristics before discarding the body by comparing it with the characteristics of disturbance body.

In the present invention, the motion characteristics analysis indicates the amount of motion done by the bodies in the captured image including the body identified as the emitter in a particular frame. Describing below the method of calculation of motion characteristics:

Consider two consecutive frames, first one as 'A' and the frame immediately after that as 'B'. Consider a particular body 'a' in frame 'B'. All the pixels of body 'a' are considered and the same pixels in the last frame are checked. Considering a total of n pixels among them are found to be a part of any body in the frame 'A', then the motion characteristics will be proportional to:

(Total number of pixels in body 'a'−n)/(Total number of pixels in body 'a')

Higher the motion characteristics of the body higher will be motion of the body. Motion characteristics=0, implies that there is high chance, that body is static. Motion characteristics=1, implies that there is a high chance that body have performed a good amount of motion. Motion characteristics anything between 0 and 1 implies that there is some motion, the magnitude of which is proportional to the value of motion. The computation unit of the processor of the present system computes the above equation to find the motion characteristics.

In the present invention, for separating the images of the different emitters on the basis of previous positions and motion the position information of last frames is involved to predict the position of bodies in the current frame. This is done by simple mathematical extrapolation techniques. The deviation of the position of body in current frame, from the predicted position facilitates in finding the body corresponding to the emitting device. Assuming that we correctly identified the hardware device in last frame, and predicted its position in the current frame, then the body with least deviation from the prediction, will have the highest chance of being the emitting device.

In the present invention, the distribution of, number of pixels at different distances from the assigned centre is analysed to identify different bodies in the image uniquely. For example a perfect circle, all the points will be at same distance from the centre. So the distribution will be something like the accompanying FIG. 3(a) while for an elliptical shape the distribution will be something the accompanying FIG. 3(b).

Once all the bodies and the emitting devices in current frame and in previous frame are identified the mapping between the bodies in two consecutive frames i.e. which body in current frame was which body, in last frame is executed. The mapping further facilitates to identify if a body in the captured image is the emitting device or not, as well as it will also help to judge that which body corresponds to which emitting device in case of multiple emitting devices.

After separation of the emitter images from rest of the image, and mapping them, the motion of the gesture indicating hardware is interpreted. If the user/users are wearing the device in different fingers, then by judging motion of the gesture indicating hardware the motion of fingers is interpreted.

For recognising the gesture of the user, the processor of the present system accumulates stream of the separated images of the gesture indicating hardware from the captured image stream and constitutes the motion path of the gesture indicating hardware. After constituting motion path of the gesture indicating hardware the key coordinate points of the motion path is determined by the coordinate computation module of the processor. The operating instruction for controlling operation of the digital devices is generated in accordance with the sequence of the key coordinate points. The processor also comprises memory device for storing user specific gesture assigned to perform any particular operation of the digital device as a sequence of the key coordinate points of motion of the gesture indicating hardware. The stored sequence of the coordinates is compared with the determined coordinates of the motion path of the gesture indicating hardware and performs the assigned operation in the digital device on matching of the sequence of the stored and the determined coordinates.

The accompanying FIGS. 4(a)-(c) illustrates the mechanism for storing the sequence of the key coordinates of motion of the gesture indicating hardware. As shown in the FIG. 4(a), the discrete points represent the coordinates that represents the motion path when a user moves the gesture indicating hardware to make "A". All the coordinates are smoothed by averaging each coordinate by some neighbour coordinates to remove any noise or irregularity. Now from this Key coordinate points (KP) are determined. The KPs are the points such that the angle between the tangents of two KPs becomes equal to or greater than a particular threshold value. The accompanying FIG. 4(b) shows two dots where the angle between them becomes the threshold value 'A'. The two points a and b thus becomes KPs. Threshold is chosen by the user. The accompanying FIG. 4(c) shows all the KPs of the gesture "A" with sequence number written. These. KPs are stored in the memory device and whenever user(s) makes any gesture like A the present system rescale the gesture to the stored gesture and find out all the KPs and match it with KPs of stored gesture. If they matched with a small error, then the gesture is recognised and the corresponding process is performed.

It is thus possible by way of the present advancement to enable digital device gesture or motion operated digital device operation and use which can be associated with any digital device such as laptops, desktops, tablets, phones and enables the device to perform all its regular activities. Further the detection of the gesture based on the deviation on the geometrical characteristics enables the present system for 3D tracking only from one normal image is itself new and it was apparently impossible before the invention. The present system advantageously involves previous frames and some standard inputs to calculate apparent distance from imaging device results 3D interpretation.

Another embodiment of the present invention is a process to identify gesture and motion path as described below:

1. An array of sequential images is captured via image capturing device also capturing the emitting device. The color coordinate is transformed for easy identification and separation of emitter.
2. A point in the color coordinates corresponding to the emitter is selected and all the pixels in the image lying in a narrow range of that point are taken and a separate image is formed from these points.
3. All the bodies beyond a particular threshold size are identified in the image.
4. The position of the emitters in the previous frame is taken to sort all the bodies in current frame in an increasing order of distance from it.
5. The images of emitting device are separated from complete image and different devices are identified distinctly.
6. Coordinates of different devices in the image are identified. Either the rescaled coordinates or the rate of change of these coordinates are used to control the pointer. Various gesture are identified from the motion of single emitter or the relative position of different emitters and used to initiate, control or close different applications. Users get the flexibility to store their own gestures and assign a different task for each gesture.

Noise reduction in the process of gesture recognition mentioned above comprises:

1. The bodies of size (number of pixels) smaller than a particular value are rejected as noises.
2. For fast processing, we calculate the directional radius at 8 angles, 0*45, 1*45, 2*45, 3*45, 4*45, 5*45, 6*45, 7*45 degrees, (* means multiplication) and take the ratio of each directional radius with the corresponding directional radius of the an emitter in previous frame. These ratios are summed up and 8 is subtracted from this value. This gives the error involved in shape.
R[0][previous]/R[0][current]+R[45][previous]/R[45][current] . . . R[7*45][previous]/R[7*45][current]−8
All the angles are measured with respect to
   (i) either the direction between assigned centres of previously selected body and the body considered.
   (ii) or the direction of the longest diameter of the body considered.
3. The boundary distance and the distance gives another error.
4. The ratio of radius perpendicular to the direction of the velocity of previously selected body to body considered is taken and 1 is subtracted from it thus allowing us to quantify another error:
Rp[previous]/Rp[current]−1
5. Motion characteristics is calculated as described in the draft and 1-motion characteristic gives another error.
6. The deviation of the body from the predicted position as described in the draft under "On the basis of previous positions and motion" gives another error.
7. Some other errors are calculated
8. Finally, the allowable range of each error is determined experimentally. The experiment can be done easily by instructing the user to move the emitter on a prescribed path at different speeds. Maximum errors in the experiment will give the allowable range of errors. All the bodies with one or more error considerably more than the allowable range, will be rejected.

Another embodiment of the present invention is a system and process to track position and orientation of a three dimensional body. Three emitters/markers are attached in the single plane forming an equilateral triangle. Another emitter is attached in the middle of three emitters in a plane other than the first plane.

Since one image sensor in the xy plane gives the x and y coordinated only, the distance between every pair of emitters is same (equilateral triangle). So we can form an equation by equating the distances by assuming there z coordinates as Z1, Z2, and Z3.

This will give us the equation, $$(X1-X2)^2+(Y1-Y2)^2+(Z1-Z2)^2=(X1-X3)^2+(Y1-Y3)^2+(Z1-Z3)^2=(X2-X3)^2+(Y2-Y3)^2+(Z2-Z3)^2$$

Taking X1, Y1 and Z1 as reference, that is taking them 0, 0, 0 and solving this equation, one can find the coordinates Z2 and Z3 in terms of other x and y coordinates. Z2 and Z3 thus found will be in reference to Z1.

This can be used to find the physical side length of the triangle, which is proportional to the distance of the triangle from the sensor. One can also find the orientation of the triangle in three dimensions using this information. The conflict of signs of Z1 and Z2 can be resolved using the position of the fourth light with respect to the centroid of the three coordinates in first plane.

In another embodiment of the present invention, image sensor is used to sense infrared radiations of wavelengths either between 1340 nanometer to 1460 nanometer or between 1740 nanometer to 2000 nanometer to avoid the problem of sun's interference with the emitter radiation as the sun's radiation intensity is very low between the above mentioned wavelength ranges.

We claim:

1. A system for controlling operation of digital devices according to gesture of its user comprising:
   at least one gesture indicating hardware;
   at least one imaging device for capturing at least one first array of images of the at least one gesture indicating hardware; and
   a processor for processing the captured stream of images for;
      identifying at least one second array of images of the at least one gesture indicating hardware from the at least one first array of images captured by the at least one imaging device;
      determining at least one geometrical characteristic of bodies present in the at least one second array of images and their variation to construct at least one motion path of the at least one gesture indicating hardware, wherein while constructing the at least one motion path of the at least one gesture indicating hardware, carrying out noise cancellation by evaluating errors as a function of size of bodies beyond a threshold size, directional radius at different angles with respect to a body considered, relative distances, boundary distances, ratio of radius perpendicular to a direction of velocity of previously selected body to the body considered, motion characteristics of various bodies identified beyond a threshold, and deviation of the body from a predicted position;
determining at least one key coordinates point representing at least one motion path; and
generating at least one operating instruction to control at least one operation of at least one digital device.

2. The system as claimed in claim 1, wherein the at least one gesture indicating hardware comprises at least one electromagnetic signal emitter for generating and emitting electromagnetic signal detectable by the at least one imaging device.

3. The system as claimed in claim 2, wherein the at least imaging device comprises at least one image sensor adapted to capture at least one image of the at least one gesture indicating hardware and detect the electromagnetic signal emitted by the at least one electromagnetic signal emitter of the at least one gesture indicating hardware.

4. The system as claimed in claim 3, wherein the at least one imaging device is provided in a separated module adapted to be disposed in operative communication with the at least one digital device.

5. The system as claimed claim 3, wherein the at least one imaging device is built in the at least one digital devices.

6. The system as claimed claim 5, wherein the at least one imaging device further comprises at least one electromagnetic signal filter adapted to block any other electromagnetic signal except the electromagnetic signal emitted from the at least one electromagnetic emitter, wherein the electromagnetic signal filter is configured to filter out all wavelength except when sun's IR radiation falls lower than intensity of the emitter or is in the range of 1340-1460 nanometer or between 1740-2000 nanometer.

7. The system as claimed in claim 6, wherein the at least one imaging device further comprises at least two image sensors adapted to constitute a single image sensor with high imaging capturing rate for smoothing imaging of motion of the at least one gesture indicating hardware.

8. The system as claimed in the claim 7, wherein the at least one imaging device comprises two image sensors with imaging capturing rate of value m are adapted to operate as individual imaging devices, each comprising single image sensors with imaging capturing rate of 2 m by initiating one of the image sensors ½ m seconds before the second image sensor.

9. The system as claimed in the claim 8, wherein the two image sensors are placed relatively at a position to obtain standard stereo vision is obtained.

10. The system as claimed in claim 9, wherein the processor for identifying and separating the images of the gesture indicating hardware comprises:
at least one pixel intensity computing module adapted to determine intensity distribution of pixels in an array of images captured by at least one image sensor to locate the at least one electromagnetic signal emitter in the image;
at least one computation unit adapted to calculate different geometrical characteristics of different bodies represented by set of connected pixels in the array of images and ratio of the geometrical characteristics of the different bodies in an image frame to that of the body identified as the at least one electromagnetic signal emitter in an previous frame; and
at least one comparator module adapted to compare the ratio values and identify at least one electromagnetic signal emitter as a body for which the ratio shows least deviation in the array of images.

11. The system as claimed in claim 10, wherein the at least one pixel intensity computing module is adapted to locate the at least one electromagnetic signal emitter in the image by determining the pixels in the image having highest intensity with surrounding pixels having decreasing intensity as a function of the distance from the said highest intensity pixels.

12. The system as claimed in claim 11, wherein the at least one computation unit is adapted to calculate point in the bodies in the image where first or higher moment of a set of connected pixels representing the bodies in the captured image is zero or a point where an intensity or intensity of selected colours is highest for assigning a centre in the body.

13. The system as claimed in the claim 11, wherein the at least one computation unit is adapted to calculate the geometrical characteristics including radii of the bodies, distance between two bodies present in the image streams with reference to the assigned centre.

14. The system as claimed in claim 13, wherein the at least one computation unit is adapted to determine motion state of the bodies in the array of captured images by calculating a ratio of total number of pixels in body 'a' minus n to the total number of pixels in body 'a';
wherein, 'a' represents a particular body in later frame of any two consecutive image frames selected from the array of captured images and n is total number of pixels that are found to be a part of any body in an earlier frame of the two consecutive image frames.

15. The system as claimed in claim 14, wherein the at least one processor is adapted to detect the movement of the at least one gesture indicating hardware including its distance from the at least one imaging device by continuously calculating variation in geometrical characteristics of the at least one electromagnetic signal emitter in the array of captured images.

16. The system as claimed in claim 13, wherein the processor further comprises coordinate computation module adapted to identify the motion path representing key coordinates points by finding pair of coordinate points in the motion path at which angle between tangents is equal to or greater than a user defined threshold value.

17. The system as claimed in claim 16, wherein the processor comprises memory devices adapted to store user specific gesture assigned to perform any particular operation of the digital device as a sequence of the key coordinate points;
wherein the stored sequence of the key coordinate points is compared with the determined key coordinates of the motion path of the gesture indicating hardware and performs the assigned operation in the digital device on matching of the sequence of the stored and the determined key coordinates.

18. A method for operating digital devices according to gesture of its user involving the system as claimed claim 1 comprising:
continuously capturing images of the at least one gesture indicating hardware;
locating a specific intensity distribution of the pixels of captured images to identify an image of the at least one electromagnetic signal emitter associated with the at least one gesture indicating hardware in the array of captured images;
determining the geometric characteristics of the set of connected pixels representing different bodies in the array of captured images;
identifying the emitter in the subsequent image streams by comparing the geometric characteristics of the bodies with the same of the body identified as the at least one electromagnetic signal emitter in the previous image frame;

determining variation in the geometric characteristics of the body identified as the at least one electromagnetic signal emitter in the array of captured images to detect the movement of the gesture indicating hardware including its distance from the imaging device, wherein while detecting the movement of the gesture indicating hardware, carrying out noise cancellation by evaluating errors as a function of size of bodies beyond a threshold size, directional radius at different angles with respect to a body considered, relative distances, boundary distances, ratio of radius perpendicular to a direction of velocity of previously selected body to the body considered, motion characteristics of various bodies identified beyond a threshold, and deviation of the body from a predicted position;

constituting the motion path of the at least one gesture indicating hardware and determining sequence of the key coordinate points in the motion path; and generating operating instructions to control the at least one digital devices in accordance with the sequence of the at least one key coordinate points in the motion path.

* * * * *